United States Patent
Shimazaki et al.

(10) Patent No.: US 6,570,779 B2
(45) Date of Patent: *May 27, 2003

(54) PULSE WITH MODULATION INVERTER GENERATION USING A CORRECTION CO-EFFICIENT AND A REFERENCE TO THE RATIO TO OBTAIN A REAL DUTY RATIO

(75) Inventors: Mitsuyoshi Shimazaki, Numazu (JP); Masanori Nakagawa, Numazu (JP); Yutaka Inaba, Numazu (JP); Kaoru Shinba, Numazu (JP)

(73) Assignee: Kokusan Denki Co., Ltd., Shizuoka-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/970,828

(22) Filed: Oct. 4, 2001

(65) Prior Publication Data

US 2003/0067793 A1 Apr. 10, 2003

(51) Int. Cl.⁷ ................................................ H02M 1/12
(52) U.S. Cl. ............................ 363/41; 363/37; 363/98
(58) Field of Search ............................. 363/34, 36, 37, 363/40, 41, 95, 98, 132

(56) References Cited

U.S. PATENT DOCUMENTS

| 4,615,000 A | * | 9/1986 | Fuji et al. ...................... 363/41 |
| 4,882,120 A | * | 11/1989 | Roe et al. ...................... 363/98 |
| 4,934,822 A | * | 6/1990 | Higaki ........................ 363/37 |
| 4,961,130 A | * | 10/1990 | Kirchberg .................... 363/41 |
| 5,055,992 A | * | 10/1991 | Cook ......................... 363/132 |
| 5,166,870 A | * | 11/1992 | Shimizu et al. ............. 363/132 |
| 5,250,890 A | * | 10/1993 | Tanamachi et al. ........... 363/98 |
| 5,282,124 A | | 1/1994 | Nakamura et al. ........... 363/36 |
| 5,327,335 A | * | 7/1994 | Maddali et al. ............... 363/95 |
| 5,436,819 A | * | 7/1995 | Mikami et al. ............... 363/98 |
| 5,450,306 A | * | 9/1995 | Garces et al. ................ 363/41 |
| 5,559,689 A | * | 9/1996 | Kirchberg et al. ............ 363/95 |
| 6,154,379 A | * | 11/2000 | Okita ........................ 363/40 |
| 6,278,622 B1 | | 8/2001 | Shimazaki et al. ........... 363/37 |
| 6,317,339 B1 | * | 11/2001 | Shimazaki et al. ........... 363/37 |

FOREIGN PATENT DOCUMENTS

| JP | 03-189142 | 7/1991 | ............ H02J/3/38 |
| JP | 10-069469 | 3/1998 | ............ H02J/3/38 |
| JP | 10-124104 | 4/1998 | ............ H02P/9/04 |
| JP | 11-013952 | 1/1999 | ............ H02P/9/04 |

* cited by examiner

*Primary Examiner*—Jeffrey Sterrett
(74) *Attorney, Agent, or Firm*—Pearne & Gordon LLP (57) ABSTRACT

An inverter generation apparatus comprising means to obtain a reference duty ratio of predetermined switch elements of an inverter on-off driven to each of switch timings so as to have a desired waveform of an AC voltage obtained across load connection terminals, means to obtain correction coefficient for the duty ratio relative to a value reflecting a variation in an output voltage of a DC power circuit, means to obtain a real duty ratio by multiplying the reference duty ratio by the correction coefficient whereby the switch elements of the inverter are on-off driven in the real duty ratio so that the desired value of the AC voltage across the load connection terminals.

8 Claims, 7 Drawing Sheets

PULSE WITH MODULATION INVERTER GENERATION USING A CORRECTION CO-EFFICIENT AND A REFERENCE TO THE RATIO TO OBTAIN A REAL DUTY RATIO

TECHNICAL FIELD OF THE INVENTION

This invention pertains to an inverter generation apparatus for converting an output of a DC power circuit to generate a DC voltage from an output obtained from a power supply source of a generator into an AC voltage having a desired waveform by using an inverter.

BACKGROUND OF THE INVENTION

In many cases, there have been used an inverter generation apparatus for converting a DC voltage obtained by rectifying an output of an AC generator into an AC voltage having a predetermined peak value and a predetermined frequency by using an inverter as an electric power supply apparatus including the AC generator driven by a primer such as an internal combustion engine and so on.

Such an inverter generation apparatus comprises a DC power circuit to output a constant DC voltage a bridge inverter to convert the DC voltage from the DC power circuit into an AC voltage, a controller to control the inverter, a filter to remove a harmonic component out of the output of the inverter, load connection terminals across which an output of the filter is applied, a load current detection circuit to detect a load current and an output voltage detection circuit to detect a voltage across the load connection terminals.

The DC power circuit comprises an internal combustion engine having a rotational speed controlled so as to rotate at a constant speed, a three-phase AC generator driven by the internal combustion engine, a control rectifier circuit to rectify an output of the AC generator, a control circuit to control the control rectifier circuit so as to maintain a DC voltage from the control rectifier circuit at a constant value and a smoothing capacitor connected across output terminals of the control rectifier circuit, for example.

The control rectifier circuit comprises a mixed bridge circuit having thyristors and diodes connected in the form of bridge so as to form a three phase full wave rectifier circuit. Three phase input terminals of the three phase full wave rectifier circuit are connected to three phase output terminals of the generator and the smoothing capacitor is connected to DC output terminals of the three phase full wave rectifier circuit.

The bridge inverter comprises a conventional circuit including four switch elements connected to each other in the form of bridge. The bridge inverter serves to convert the output voltage of the DC power circuit into the AC voltage by controlling the respective switch elements of the inverter so that a period during which one pair of switch elements located at one dialogical position of the bridge are in the on-state and a period during which another pair of switch elements located at another dialogical position thereof are in the on-state alternately appear.

The filter provided on the output side of the inverter is formed of a low pass filter comprising coils, capacitors and resistors and serves to remove a harmonic component included in the output of the inverter to form the output The controller serves to generate a pulse width modulation signal (PWM signal) commanding to turn on and off the predetermined switch elements of the inverter at a predetermined duty ratio to each of the switch timings appearing for a predetermined PWM period so as to generate the AC voltage of a given waveform across the pair of the load connection terminals.

Also, the controller serves to read the instant value of the voltage across the load connection terminals through the output voltage detection circuit and compare the actually read instant value of the AC voltage with the desired instant value of the AC voltage to be obtained across the load connection terminals, which is previously stored in a ROM or the like of the microcomputer to correct the on-off duty ratio of the switch elements of the inverter to each of the switch timings. This obtains the AC output voltage of sine wave having the desired instant value across the load connection terminals.

Furthermore, the controller serves to stop supplying a drive signal to each of the switch elements of the inverter when the load current exceeds the allowable maximum value and then the value of the output voltage of the load current detection circuit exceeds the maximum value. Thus, the controller stops the operation of the inverter and prevents the switch elements of the inverter from being damaged due to its overcurrent.

However, in case that the AC voltage of the desired value is obtained across the load connection terminals by feeding back the instant value of the AC voltage across the load connection terminals to the controller to correct the duty ratio so that the AC voltage of desired magnitude is obtained across the load connection terminals, the waveform of the AC output voltage is disadvantageously distorted when the output voltage of the DC power circuit is lower than the peak value of the AC output voltage to be obtained across the load connection terminals and when the output voltage of the DC power circuit exceeds the peak value of the AC output voltage to be obtained across the load connection terminals.

Thus, in the prior inverter generation apparatus, it is difficult to maintain the waveform of the AC output voltage in case that the output voltage of the DC power circuit has the narrow allowance range of variation allowing the desired waveform of the AC output voltage to be maintained and therefore in case that the load has the larger variation width.

SUMMARY OF THE INVENTION

Accordingly, it is a principal object of the invention to provide an inverter generation apparatus adapted to have a wider allowance range of variation of an output voltage of a DC power circuit allowing a waveform of an AC output voltage without any distort of the waveform of the AC output voltage even though the output voltage of the DC power circuit has some variation.

In accordance with one aspect of the invention, there is provided an inverter generation apparatus comprising a DC power circuit to obtain a DC voltage from an output of a generator as a power source, a bridge type inverter to which the DC voltage is input from the DC power circuit, a filter to remove a harmonic component of an output of the inverter, load connection terminals to which the output of the filter is input and a controller to control an on-off operation of each of predetermined switch elements of the inverter in a predetermined duty ratio to switch timings appearing for predetermined PWM period so as to obtain an AC output voltage of desired waveform across the load connection terminals, the controller comprising duty correction means to correct the duty ratio of the on-off operation of the element switches on-off driven to each of the switch timings for maintaining a predetermined waveform of the AC output voltage obtained across the load connection terminals even though the output voltage of said DC power circuit varies.

In a preferred mode of the invention, the inverter generation apparatus further comprises a DC voltage detection circuit to detect a DC voltage output by the DC power circuit and the controller comprises duty correction means to correct the duty ratio of said on-off operation of the element switches on-off driven to each of the switch timings in accordance with a magnitude of the DC voltage detected by the DC voltage detection circuit for maintaining a set peak value of the AC output voltage obtained across the load connection terminals.

In another preferred mode of the invention, the inverter generation apparatus further comprises a DC voltage detection circuit to detect a DC voltage VD output by the DC power circuit and the controller comprises reference duty ratio arithmetical operation means to arithmetically operate as a reference duty ratio Do an on-off duty ratio of the switch elements to each of the switch timings for forming a desired waveform of the AC output voltage obtained from the inverter through the filter, correction coefficient arithmetical operation means to arithmetically operate a correction coefficient Kv=VA/VD by which the reference duty ratio to each of the switch timings should be multiplied so that a peak value of the AC output voltage gets equal to a set value VA, real duty ratio arithmetical operation means to arithmetically operate an on-off real duty ratio D of the switch elements to each of the switch timings by multiplying the reference duty ratio Do by the correction coefficient Kv and drive signal supply means to apply a drive signal to each of the switch elements of the inverter so as to make an on-off operation of the switch elements in the real duty ratio obtained by the real duty ratio arithmetical operation means.

With the apparatus constructed as aforementioned, since the on-off duty ratio of the switch elements of the inverter can be corrected in accordance with the output voltage of the DC current power circuit, the allowable range of variation of the output voltage of the DC power circuit by which the sine wave form of the AC output voltage can be maintained can be wider than that of the prior art.

In a further preferred mode of the invention, the controller comprises reference duty ratio arithmetical operation means to arithmetically operate as a reference duty ratio Do an on-off duty ratio of the switch elements to each of the switch timings for forming a desired waveform of the AC output voltage obtained from the inverter through the filter, load voltage detection circuit means to detect the AC output voltage obtained across the load connection terminals; correction coefficient arithmetical operation means to arithmetically operate a correction coefficient Kv=VA/VD by which the reference duty ratio to each of the switch timings should be multiplied so that a value reflecting a cumulative value of the output voltage detected by the load voltage detection circuit during a period of 1/α or α (α is a positive integer of one or more than one) of the AC voltage obtained across the load connection terminals is made equal to a set value; real duty ratio arithmetical operation means to arithmetically operate an on-off real duty ratio D of the switch elements to each of the switch timings by multiplying the reference duty ratio Do by the correction coefficient Kv and drive signal supply means to apply a drive signal to each of the switch elements of the inverter so as to make an on-off operation of the switch elements in the real duty ratio D obtained by the real duty ratio arithmetical operation means.

There may be used an average value of the AC voltage obtained from the cumulative value, an effective value thereof or a square of the effective value thereof, for example for the value reflecting the cumulative value. Otherwise, the value reflecting the cumulative value may be the cumulative value itself.

The value obtained by sequentially cumulating the output voltage detected by the load voltage detection circuit to each of the switch timings for the period better in view of the waveform of the AC voltage obtained across the load connection terminals, which may be a quarter of cycle, a half of cycle, one cycle, two cycles or three cycles of the AC voltage may be the value reflecting the variation in the output voltage of the DC power circuit.

Thus, as the duty ratio of the switch elements on-off driven to each of the switch timings is obtained by multiplying the reference duty ratio Do by the required correction coefficient Kv arithmetically operated so that the value such as the cumulative value, the average value, the effective value, the squared effective value and so on reflecting the cumulative value of the output voltage detected by the load voltage detection circuit to each sample timings for the period better in view of the waveform of the AC voltage obtained across the load connection terminals, the AC voltage having the predetermined peak value can be obtained across the load connection terminals without detecting the output voltage of the DC power circuit. This can omit the DC voltage detection circuit so that the apparatus has a simplified construction and reduce the cost thereof.

Also, with the apparatus constructed as aforementioned, since the duty ratio of the on-off operation of the switch elements of the inverter circuit can be controlled so that the value reflecting the cumulative value Of the detection value of the output voltage always gets the predetermined value in spite of the magnitude of the load current, large difference between the output voltage such as the average value or the effective value when loaded and the output voltage when unloaded can be effectively prevented.

BRIEF DESCRIPTION OF THE DRAWINGS

The above and other objects and features of the invention will be apparent from the detailed description of the preferred embodiments of the invention, which are described and illustrated with reference to the accompanying drawings, in which.

DETAILED DESCRIPTION OF PREFERRED EMBODIMENTS

Figure 1:
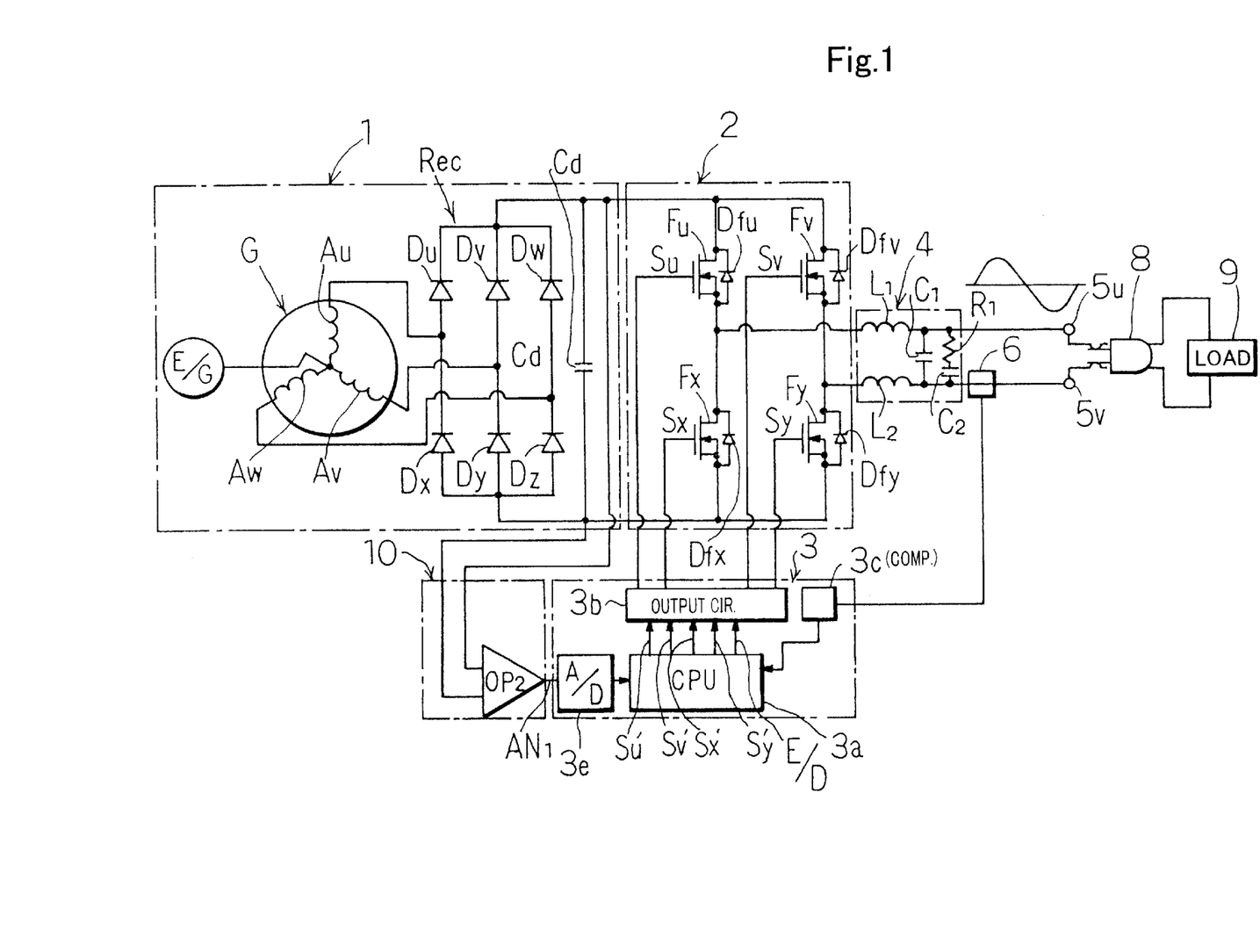
FIG. 1 is a schematic diagram of the inverter generation apparatus constructed in accordance with one of the embodiments of the invention.

Referring now to FIG. 1, there is shown an inverter generation apparatus constructed in accordance with one embodiment of the invention. The inverter generation apparatus comprises a DC power circuit 1, a bridge inverter 2 to which an output voltage of the DC power circuit 1 is input, a controller 3 to control the inverter, a filter 4 to remove a harmonic component out of an AC voltage obtained from the inverter 2, load connection terminals 5u and 5v across which an output from the filter 4 is applied, a load current detection circuit 6 and a DC voltage detection circuit 10 which detects an output voltage of a DC power circuit 1. Appropriate loads 9 may be connected across the load connection terminals 5u and 5v through a connector 8.

The filter 4 may be of a low pass filter comprising coils L1 and L2, capacitors C1 and C2 and a resistor R1 and serves to remove a harmonic component included in the AC voltage obtained from the inverter 2 so as to smooth the waveform of the output voltage.

The DC voltage of the DC power circuit 1 is input to the controller 3 through a DC voltage detection circuit 10 comprising an operational amplifier OP2.

The DC power circuit 1 used in the embodiment of FIG. 1 comprises an internal combustion engine E/G, a magneto AC generator G driven by the internal combustion engine E/G, a full-wave rectifier Rec formed of diodes Du through Dw and Dx through Dz connected to each other in a bridged manner and a smoothing capacitor Cd connected across output terminals of the rectifier Rec.

Figure 4:
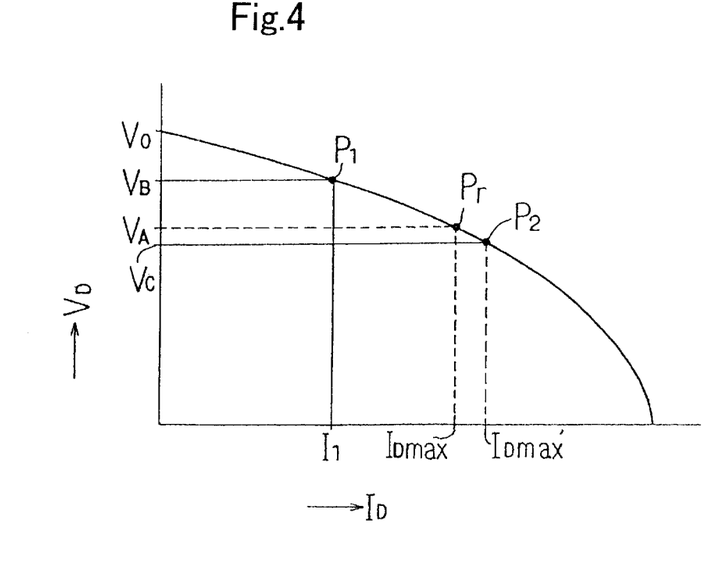
FIG. 4 illustrates an example of the output voltage to output current characteristics of the DC power circuit of the apparatus shown in FIG. 1.

Since the DC power circuit 1 uses the full-wave rectifier Rec having no thyristor included therein so as to rectify the output of the generator G, the characteristic of output current ID to output voltage VD of the DC power circuit 1 gets a drooping one as shown in FIG. 4.

The bridge inverter 2 may comprise a conventional switch circuit having switch elements Fu, Fv, Fx and Fy connected to each other in a bridging manner and serving to switch the polarity of the current flowing from the DC power circuit 1 through the load. In the illustrated embodiment, the switch elements Fu, Fv, Fx and Fy are formed of MOSFET. The drains of the FET Fu and the FET Fv are commonly connected to each other, the sources of the FET Fx and the FET Fy are commonly connected to each other and the drains of the FET Fx and the FET Fy are connected to the sources of the FET Fu and the FET Fv, respectively. Incidental diodes Dfu, Dfv, Dfx and Dfy are provided between the drains and the sources of the FET Fu, the FET Fv, the FET Fx and the FET Fy, respectively.

The bridge inverter 2 is so controlled that there alternately occur the period for which the switch elements Fu and Fy located at a diagonal position of the bridge are in the on-state and the period for which the switch elements Fv and Fx located at another diagonal position are in the on-state whereby the DC voltage of the DC power circuit is converted into the AC voltage.

The controller 3 comprises a microcomputer including a CPU 3a and ROMs, RAMS, counters, timers and so on not shown, a drive signal output circuit 3b to apply drive signals (turning-on signals) to the switch elements Fu, Fv, Fx and Fy of the inverter circuit, respectively, in accordance with the commands from the CPU 3a, a comparator 3c to compare the detection value of the load current obtained from the load current detection circuit 6 with the limit value to apply an over-current detection signal to the CPU 3a when the detection value of the load current exceeds the limit value and an A/D converter to convert the output of the DC voltage detection circuit 10 into a digital signal and apply the same to the CPU 3a.

The CPU 3a generates drive command signals Su', Sv', Sx' and Sy' to predetermined timings to command the switch elements Fu, Fv, Fx and Fy of the inverter 2 to be driven or turned on and apply these drive command signals to the drive signal output circuit 3b.

Also, the CPU 3a applies to the drive signal output circuit 3b an E/D signal (an ENABLE/DISABLE signal) which gets an ENABLE state to command the operation to be allowed when the condition of allowing the operation of the inverter 2 is established and a DISABLE state to command the operation to be prohibited when the condition of prohibiting the operation of the inverter circuit 2 is established.

The drive signal output circuit 3b applies the drive signal Su, Sv, Sx and Sy to the gates of the switch elements (the FETs in the illustrated embodiment) when the drive command signals Su', Sv', Sx' and Sy' are applied in the state where the ENABLE signal is applied from the CPU 3a.

The CPU 3a generates the drive command signals Su', Sv', Sx' and Sy' to command the switch elements of the inverter circuit to turned on so that there alternately occur the period for which the switch elements Fu and Fy located at one diagonal position of the bridge are in the on-state and the period for which the switch elements Fv and Fx located at another diagonal position are in the on-state whereby the DC voltage of the DC power circuit is converted into the AC voltage.

The CPU 3a detects switch timings whenever the PWM period detecting counter provided in the microcomputer counts clock pulses of predetermined number corresponding to the PWM period Δt.

The CPU 3a generates for the given PWM periods Δt (whenever the switch timings are detected) at least one of the drive command signals Su' and Sv' to command to apply the drive signals to the upper switch elements of the inverter 2 and at least one of the drive command signals Sx' and Sy' to command to apply the drive signals to the lower switch elements as the PWM signals of waveform continuing in the predetermined duty ratio for forming a desired waveform of the AC voltage obtained across the load connection terminals. This outputs the voltage of waveform into which the AC voltage of desired waveform is PWM modulated and which has the waveform obtained by interrupting at least one of the drive signal Su and Sv and at least one of the drive signals Sx and Sy in the predetermined duty ratio.

The PWM signal is of a two-value signal having two states of H level (High level) and L level (Low or zero level). The PWM signal commands to turn on the switch elements for the period where its level is either of H level and L level and to turn off them for the period where it is another level. It is supposed that the period where the PWM signal is at H level is one for which the switch elements are maintained in the on-state in the description hereinafter.

In the description, what is meant by the "on-off duty ratio" of the switch elements is the ratio Δt on/Δt in which the period Δt on for which the switch elements of the inverter circuit is in the on-state occupies the PWM period Δt.

The CPU 3a makes an internal interruption whenever the respective switch timings are detected and arithmetically operates the on-off duty ratio of the switch elements on-off controlled to the switch timings in the internal interruption. The on-time (the time for which the switch elements are kept at the on-state) is set to the PWM signal generating counter in accordance with the duty ratio thus obtained by the arithmetical operation and the potential of the port from which the drive command signal is output is kept at the H level while the timer measures the on-time so that there is generated the PWM signal or drive command signal commanding to get the on-state of the predetermined switch elements of the inverter circuit.

Supposed that the period of the AC output voltage obtained across the load connection terminals is "T", the CPU 3a is supposed to make the internal interruption in the ratio of T/Δt per cycle of the AC output voltage.

In case that the waveform of the AC output voltage is of sine waveform, a reference duty ratio Do of the on-off operation of the switch elements in which the switch elements are on-off controlled to the n-th switching timing ("n" is a positive integer of 0 to T/Δt) is given by the following formula;

$$Do = \sin(2\pi n \Delta t / T) \quad (1)$$

wherein "n" of zero corresponds to the zero point where the AC output voltage transfers from the negative half wave to the positive half wave.

The CPU 3a arithmetically operates the reference duty ratio Do given by the formula (1) whenever the n-th switch timing is detected. The reference duty ratio Do may be arithmetically operated in a practical manner using the formula (1) or in a map method in which the data read from a map previously stored in the ROM for arithmetically operating the reference duty ratio. Thus, reference arithmetical operation means can be accomplished by such steps of arithmetically operating the reference duty ratio Do.

Also, the CPU 3a arithmetically operates a correction coefficient Kv(=VA/VD) by which the reference duty ratio Do should be multiplied for making the peak value of the AC output voltage equal to a set or desired value VA stored in the ROM. The arithmetical operation is made by dividing the set value VA by the DC voltage VD obtained by reading through the DC voltage detection circuit 10 and the A/D converter 3e the data AN1 of the DC voltage output by the DC power circuit 1. The CPU 3a arithmetically operates a real duty ratio D by multiplying the reference duty ratio Do by the correction coefficient Kv (=VA/VD).

Correction coefficient arithmetical operation means can be accomplished by the aforementioned step of arithmetically operating the correction coefficient and real duty ratio arithmetical operation means can be accomplished by the aforementioned step of multiplying the reference duty ratio Do by the correction coefficient Kv.

The CPU 3a generates the drive command signals Su', Sv', Sx' and Sy' so that the switch elements of the inverter are turned on or off to the respective switch timings in the real duty ratio obtained in the drive command signals to the drive signal output circuit 3b. The drive signal output circuit 3b applies the drive signal to the predetermined switch elements of the inverter 2 in accordance with the command given from the CPU 3a and turns on or off the predetermined switch elements.

Figure 6:
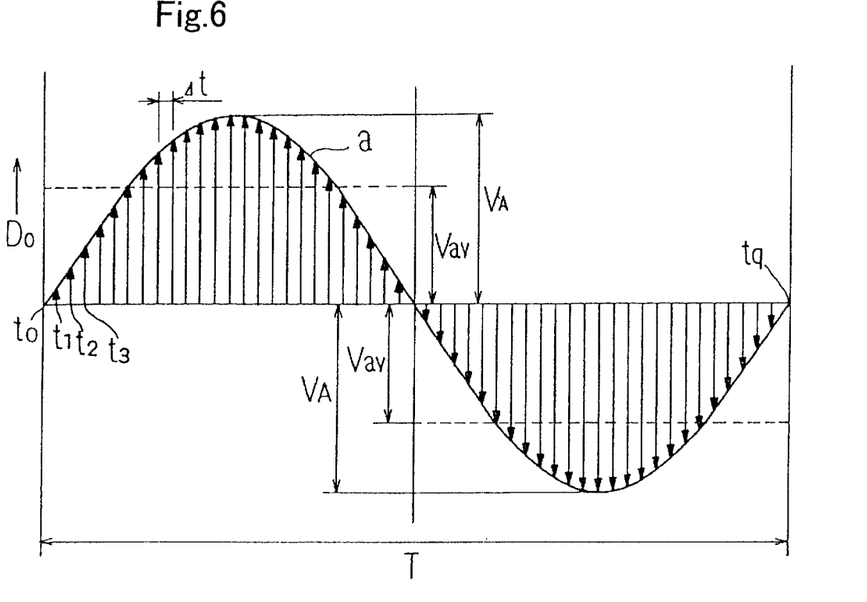
FIG. 6 illustrates the waveform showing the relation between the internal interruption timing of the microcomputer of the controller in the apparatus of the invention and the duty ratio of the PWM signal in case that the reference voltage is of sine waveform.

FIG. 6 illustrates the relation between the switch timings t0, t1, ..., tq (q=T/Δt) and the reference duty ratios Do given to the respective switch timings by the formula (1). In FIG. 6, "a" designates the AC output voltage of sine waveform to be obtained across the load connection terminals, "Δt" designates the PWM period, "VA" designates the peak value of the AC output voltage, "Vav" designates an average value of the AC output voltage "a" and "T" designates one cycle or period of the AC output voltage.

As shown in FIG. 6, the duty ratio of the PWM signal varies for every Δt in accordance with a variation in the instant value of the AC output voltage a of sine waveform. The inverter 2 outputs the AC voltage having the waveform PWM modulated by dividing the sine-wave AC voltage of one cycle into "n" portions.

Figure 7:
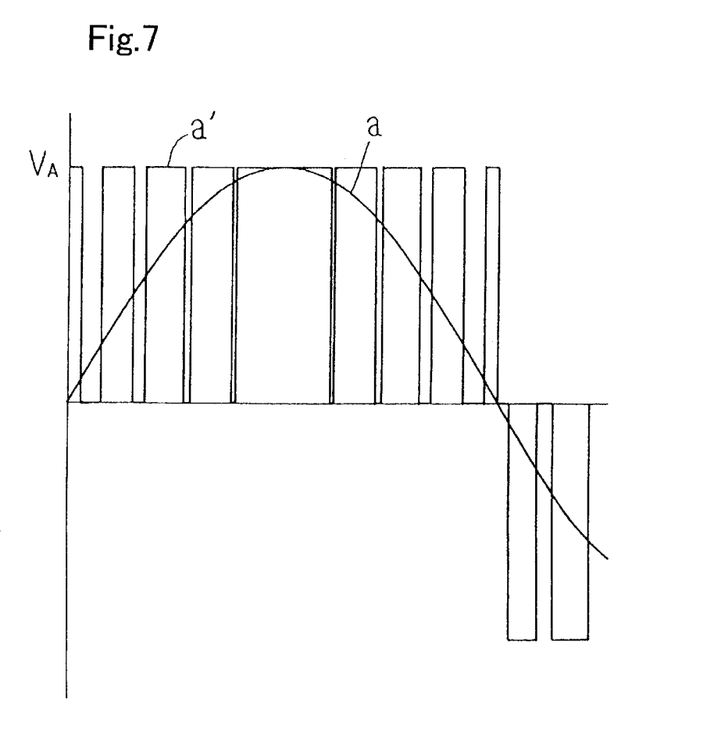
FIG. 7 illustrates an example of the waveforms of the AC voltage obtained from the inverter of the inverter generation apparatus.
Figure 8A:
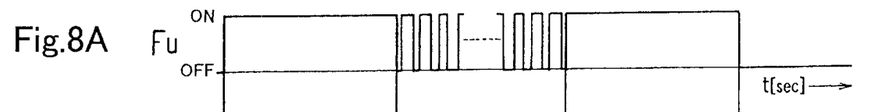
FIGS. 8A through 8D are timing charts showing an example of the on-off patterns of the inverter switches of the inverter generation apparatus.
Figure 8B:
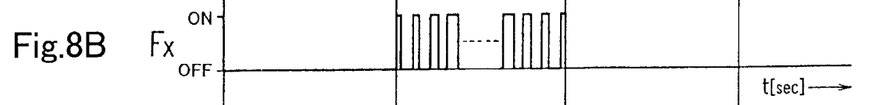
Figure 8C:
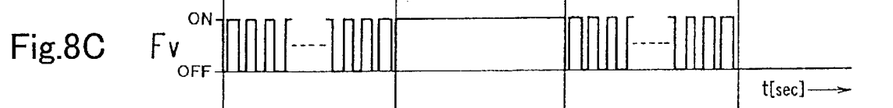
Figure 8D:
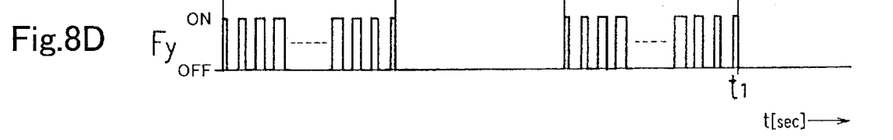

FIG. 7 illustrates the waveforms of the PWM modulated sine-wave AC voltage a and the voltage a' obtained by PWM modulating the AC voltage a. The smoothing sine-wave output voltage a can be obtained across the load connection terminals 5u and 5v by passing the PWM modulated AC voltage a' through the filter 4 to remove the harmonic component out thereof.

In case that the PWM modulated AC voltage a' shown in FIG. 7 is obtained from the inverter 2, the switch elements Fu, Fv, Fx and Fy of the inverter 2 are on-off controlled in a switch pattern as shown in FIGS. 8A through 8D.

In an example of FIGS. 8A through 8D, the switch element Fu is kept in the on-state during the period of positive half wave of the sine-wave AC voltage and the switch element Fy located at the diagonal position relative to the switch element Fu is turned on or off in the predetermined duty ratio while the switch element Fu is kept in the on-state. Meanwhile, the switch element Fx located on the same arm as the switch element Fu kept in the on-state is kept in the off-state and the switch element Fv located on the same arm as the switch element Fy on-off controlled is turned on or off in a pattern reverse to the on-off pattern of the switch element Fy.

The switch element Fv is kept in the on-state during the period of the negative half wave of the sine-wave AC voltage and the switch element Fx located at the diagonal position relative to the switch element Fv is turned on or off in the predetermined duty ratio. Meanwhile, the switch element Fy located on the same arm as the switch element Fv is kept in the off-state and the switch element Fu located on the same arm as the switch element Fx on-off controlled is turned on or off in a pattern reverse to the on-off pattern of the switch element Fx. The inverter circuit 2 is so controlled that the switch elements on the same arm are never simultaneously in the on-state, which prevents the power source from being shorted.

As aforementioned, in the example of FIGS. 8A through 8D, the switch element located at the lower position of the respective arms among the switch elements located at the diagonal position are on-off controlled by the PWM signal. When the switch element at the lower position of the respective arms, the switch element Fx, for example should be on-off controlled, the switch element Fu on the same arm may be kept in the off-state. In the example of FIG. 8, when the switch element at the lower position of the respective arms is on-off controlled, the switch element at the upper position of the same arm is turned on or off in a pattern reverse to the on-off pattern of the lower switch element on the same arm. With the switch elements so controlled, since the charge stored in the capacitor of the filter 4 during the period of the on-state of the lower switch element on each of the arms can be released when the upper switch element on the corresponding arm is turned on, the waveform of the AC voltage obtained across the load connection terminals can be more positively close to the sine wave.

In the aforementioned inverter generation apparatus, the higher the frequency of the PWM signal is, the more the number of the interruption made during one cycle of the AC voltage is. Thus, it will be noted that the waveform of the output voltage has a smoother one closer to the sine wave. However, since the frequency of the PWM signal is required to be determined in consideration of a delay time required after the CPU 3a of the controller 3 generates the PWM signal until the switch elements are actually operated and the performance such as internal process time of the CPU, the frequency of the PWM signal cannot be infinitely higher. Generally, the frequency of the PWM signal is set approximately at 10 KHz and the constants of the coils L1 and L2, the capacitors C1 and C2 and the resistor R1 of the filter 4 are determined on the frequency of the PWM signal.

In the generation apparatus of FIG. 1, drive signal supply means can be accomplished by the generation of the drive command signal from the CPU 3a in accordance with the arithmetically operated real duty ratio and the predetermined switch pattern and the drive signal output circuit 3b to apply the drive signal in accordance with the drive command signal.

In the illustrated embodiment, duty ratio correction means to correct the on-off duty ratio of the switch elements of the inverter in accordance with the magnitude of the DC voltage detected by the DC voltage detection circuit 10 so that the waveform of the AC output voltage is made the sine wave and has the peak value kept at the set value is formed by the correction coefficient arithmetical operation means, the real duty ratio arithmetical operation means and the drive signal supply means.

In the generation apparatus of FIG. 1, when the load current detection circuit 6 detects the over-current, the CPU 3a disables the E/D signal (ENABLE/DISABLE signal) applied to the drive signal output circuit 3b. At that time, the drive signal output circuit 3b stops supplying the drive signal to the respective switch elements of the inverter 2 to stop the operation of the inverter 2 and prevent the switch elements of the inverter circuit from being damaged by the over-current. In the example of FIGS. 8A through 8D, the over-current detection signal is applied to the CPU 3a to the timing t1 shown in FIG. 8 to stop supplying the drive signal.

As the real duty ratio D is determined by multiplying the reference duty ratio Do by the correction coefficient Kv which is the ratio of the peak value VA of the AC output voltage to be obtained across the load connection terminals relative to the output voltage VD of the DC power circuit as aforementioned, the duty ratio of the on-off operation of the switch elements of the inverter can be so corrected that the peak value of the AC output voltage can be kept at the set value in spite of the variation in the output voltage of the DC power circuit. Thus, it will be noted that the AC output voltage having the desired peak value can be obtained across the load connection terminals without controlling the output voltage of the DC power circuit so as to be kept at a constant value.

It is supposed that the DC power circuit 1 has the characteristic of output current VD to output current ID as shown in FIG. 4 so that the DC power circuit 1 outputs the DC voltage equal to the desired peak value VA of the AC output voltage when the output current ID is equal to I Dmax. In this case, if the operation point is Pr relative to the magnitude of the load current corresponding to I Dmax, the AC output voltage having the peak value approximate to the desired value can be obtained by turning on or off the switch elements of the inverter to the respective switch timings in the reference duty ratios thereof.

As the operation point is transferred to P1 due to the reduction of the load current, the output voltage of the DC power circuit 1 is raised to VB and therefore the peak value of the AC output voltage will be raised to the value corresponding to VB if the switch elements of the inverter 2 continues to be on-off controlled in the reference duty ratios. According to the invention, since the real duty ratio is corrected to Do×(VA/VB) at that time, the AC output voltage having the desired peak value can be obtained.

Reversely, as the operation point is transferred to P2 of FIG. 4 so that the output voltage of the DC power circuit 1 is lowered to Vc (<VA), the peak value of the AC output voltage is lowered to the value corresponding to Vc. Similarly, since the instant value of the AC output voltage is corrected by the larger correction coefficient Kv at the portion of the instant value of Vc, the distortion of the waveform can be restrained. Thus, it will be noted that the magnitude (the average or effective value) of the AC output voltage can be prevented from being reduced far away from the set value.

In the prior art generation apparatus, the DC power circuit has the control rectifier circuit used therein and the output voltage of the DC power circuit is kept at a constant value relative to the output current by controlling the control rectifier circuit.

Also, in the prior art generation apparatus, the duty ratio of the on-off operation of the switch elements to the respective switch timings is corrected so that there is no difference between the actual instant value of the AC output voltage detected across the load connection terminals 5u and 5v and the desired instant value of the AC voltage memorized in the ROM of the microcomputer by comparing the actual instant value with the desired one and thereby the AC output voltage having the desired instant value is obtained across the load connection terminals.

Figure 9:
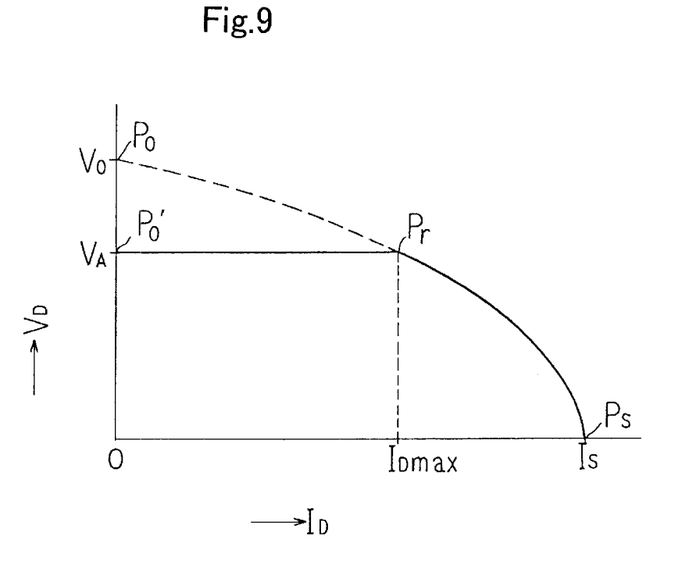
FIG. 9 illustrates another example of the output voltage to output current characteristics of the DC power circuit used for the inverter generation apparatus of the invention.

As in the prior art generation apparatus, with the output voltage of the DC power circuit controlled so as to be kept at the constant value relative to the load current, the characteristic of output voltage VD to output current ID of the DC power circuit 1 is as indicated by a curve Po'-Pr-Ps of FIG. 9.

The curve Po-Pr-Ps of FIG. 9 shows the characteristic of output voltage VD to output current Id in case that the rectifier circuit of the DC power circuit 1 is formed only of diodes so as not to control the output voltage. This is identical to that of FIG. 4.

Figure 5:
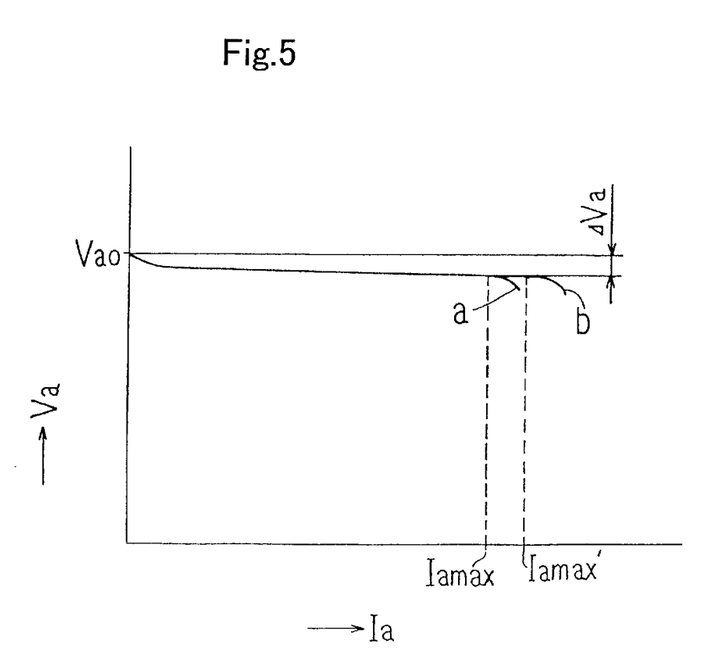
FIG. 5 illustrates a comparison of the output voltage to output current characteristics of the generation apparatus of the invention with that of the prior art generation apparatus.

As in the prior art generation apparatus, with the AC voltage having the desired instant value obtained by using the DC power circuit having the output voltage controlled so as to be kept at the constant value and further correcting the duty ratio of the on-off operation of the switch elements of the inverter so that there is no difference between the actual instant value of the AC output voltage detected across the load connection terminals and the desired instant value, the characteristic of providing the relation between the AC output voltage Va (the average value) of the inverter generation apparatus and the load current Ia (the average value) is as indicated by a curve "a" of FIG. 5. In this figure, Vao designates the AC output voltage when no load is applied and ΔVa designates an allowable variation in the voltage.

In this case, the average value Va of the AC output voltage is at Vao when no load is applied and as the load current flows, the average Va is slightly reduced, but the AC output voltage Va is kept approximately at the constant value until the load current reaches Iamax. As the load current exceeds I amax, the AC output voltage Va is reduced so that the sine wave cannot be maintained because the output current of the DC power circuit exceeds I Dmax so that the output voltage of the DC power circuit is reduced until the controller 3 cannot control it.

Figure 10:
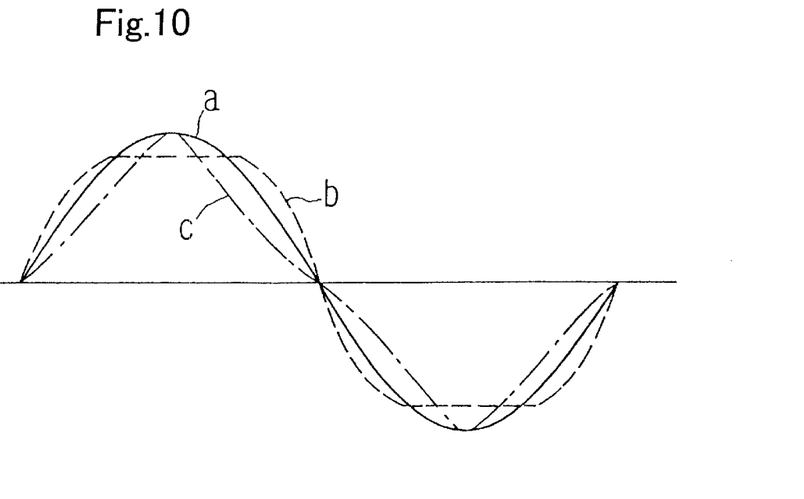
FIG. 10 illustrates the relation between the waveform of the AC output voltage of the inverter generation apparatus of the invention and the waveform of the output voltage of the DC power circuit thereof.

FIG. 10 illustrates the relation between the waveform of the output voltage of the DC power circuit and the waveform of the AC output voltage obtained across the load connection terminals. A curve "a" of FIG. 10 shows the waveform of the output voltage of the DC power circuit when it is proper or equal to approximately the desired peak value of the AC output voltage. Curves "b" and "c" of FIG. 10 show the waveforms of the output voltage of the DC power circuit when it is lower than the proper value or higher than the same, respectively.

In this manner, in case that the AC output voltage having the desired magnitude is obtained across the load connection terminals by correcting the duty ratio so that there is no difference between the instant value and the set value by feeding back to the controller the instant value of the AC output voltage obtained across the load connection terminals 5u and 5v, it is difficult to maintain the waveform of the AC output voltage relative to the variation in output voltage of the DC power circuit and when the output voltage of the DC power circuit gets the value lower than the desired peak value of the AC output voltage or when it gets the value higher than the desired peak value, the waveform of the AC output voltage is disadvantageously distorted.

On the other hand, according to the invention, since the duty ratio of the on-off operation of the switch elements of the inverter can be corrected relative to the output voltage of the DC power circuit, the AC output voltage having no waveform distortion can be obtained even though there is substantial difference between the output voltage of the DC power circuit and the desired value of the AC output voltage and such an allowable range of variation of the output voltage of the DC power circuit as maintains the sine waveform of the AC output voltage can be wider than in the prior art.

The characteristic of providing the relation between the output voltage (the average value) Va of the output voltage of the inverter generation apparatus and the output current (the average value) Ia is as indicated by a curve "b" of FIG. 5. As aforementioned, in the prior art generation apparatus, the load current is required to be limited to the value of I amax (the value corresponding to I Dmax of FIG. 4) or less in order to maintain the waveform distortion of the AC output voltage within the allowable range and obtain the allowable range of the voltage variation ΔVa. On the other hand, in the generation apparatus of the invention, since the voltage variation ΔVa can be maintained within the allowable range until the load current reaches Iamax' (>Iamax) as indicated by the curve "b" of FIG. 5 by correcting the duty ratio of the on-off operation of the switch elements of the inverter in accordance with the output voltage of the DC power circuit, the limit value of the load current can increase from Iamax to Iamax' and therefore the allowable range of load can be enlarged.

In the illustrated embodiment, the reference duty ratio arithmetical operation means, the correction coefficient arithmetical operation means and the real duty ratio arithmetical operation means are provided so that the arithmetical operation of the reference duty ratio Do, the correction coefficient Kv and the real duty ratio D is sequentially made, but since variables used when the real duty ratio D is arithmetically operated are only the output voltage VD of the DC power circuit 1 and the number n of the switch timings and since T, Δt and VA are constant, a three-dimensional map for arithmetically operating the real duty ratio D and providing the relation among the output voltage VD of the DC power circuit, the number n and the real duty ratio D may be previously prepared and memorized in the ROM. Thus, the real duty ratio D can be arithmetically operated by using the three-dimensional map.

In this case, real duty ratio arithmetical operation means can be accomplished by the step of arithmetically operating the real duty ratio D by using the detected value of the output voltage VD of the DC power circuit, the number n of the switch timings and the three-dimensional map for the real duty ratio arithmetical operation memorized in the ROM.

With the apparatus constructed as aforementioned, since the duty ratio of the on-off operation of the switch elements of the inverter to the respective switch timings can be corrected in accordance with the output voltage of the DC power circuit, the sine wave AC voltage having the constant peak value can be obtained without any control circuit to control the output voltage of the DC power circuit so as to be kept constant. Thus, the construction of the circuits can be simplified because the control circuit to control the output of the DC power circuit can be omitted.

Figure 2:
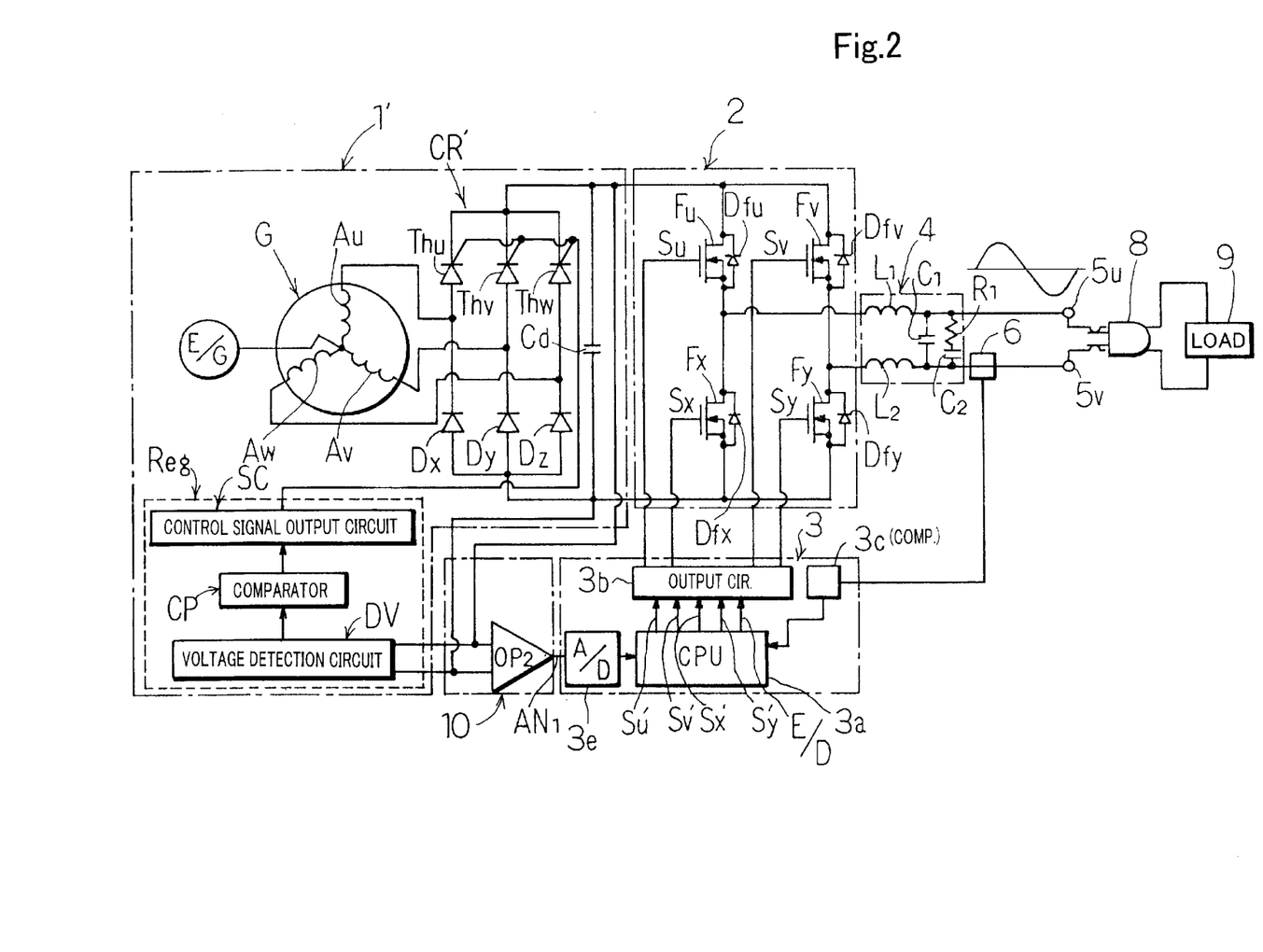
FIG. 2 is a schematic diagram of the inverter generation apparatus constructed in accordance with another embodiment of the invention.

Nevertheless, it should be noted that the invention is never limited to the apparatus having no control of the output voltage of the DC power circuit and that it may be applied to the apparatus including the DC power circuit having the control circuit to control the output voltage so as to be kept at a constant value as shown in FIG. 2.

In the embodiment of FIG. 2, the DC power circuit 1 comprises an internal combustion engine E/G, a three-phase AC generator G, a control rectifier circuit CR to rectify the output of the generator G, a control circuit Reg to control the control rectifier circuit CR and a power capacitor Cd connected between output terminals of the control rectifier circuit CR.

The control rectifier circuit CR comprises a mixed bridge circuit formed of thyristors Thu through Thw and diodes Dx through Dz and having three phase input terminals to which three phase output terminals of the generator are connected and DC output terminals between which the capacitor Cd is connected.

The control circuit Reg to control the thyristors Thu through Thw comprises a voltage detection circuit DV to detect the voltage across the capacitor Cd, a comparator CP to compare the output voltage of the voltage detection circuit DV with a set voltage and a control signal output circuit SC to apply control signals (triggering signals) to the thyristors Thu through Thw in accordance with the output of the comparator CP so as to make the output voltage of the voltage detection circuit DV equal to the set voltage.

In this manner, the characteristic of output voltage VD to output current ID of the DC power circuit using the control rectifier circuit is as indicated by a curve Po'-Pr-Ps of FIG. 9 and therefore the output voltage VD can be kept at a constant value relative to the output current of I Dmax or less.

Especially, in case that the drooping characteristic of the generator G has a larger voltage drop ratio, controlling the output voltage of the DC power circuit so as to be kept at a constant value as shown in FIG. 2 as well as controlling the duty ratio in accordance with the output voltage of the DC power circuit are more effective for obtaining the smoothing AC output voltage.

Although, in the illustrated embodiments, the real duty ratio D is obtained by multiplying the reference duty ratio Do by the correction coefficient Kv which is the ratio of the peak value VA of the AC output voltage to the output voltage VD of the DC power circuit, it may be obtained by multiplying the reference duty ratio by the correction coefficient which is obtained based on the value reflecting the variation in the DC voltage and therefore the correction coefficient Kv is not limited to the ratio VA/VD of the peak value of the AC output voltage and the output voltage VD of the DC power circuit.

For example, since the variation in the output voltage of the DC power circuit is reflected in the average value and the effective value of the AC output voltage, the correction coefficient by which the reference duty ratio Do should be multiplied is obtained in order to make the value such as the average value or the effective value reflected by the cumulative value of the sampling value of the AC output voltage equal to the set value and the real duty ratio can be obtained by multiplying the reference duty ratio Do by the thus obtained correction coefficient.

Figure 3:
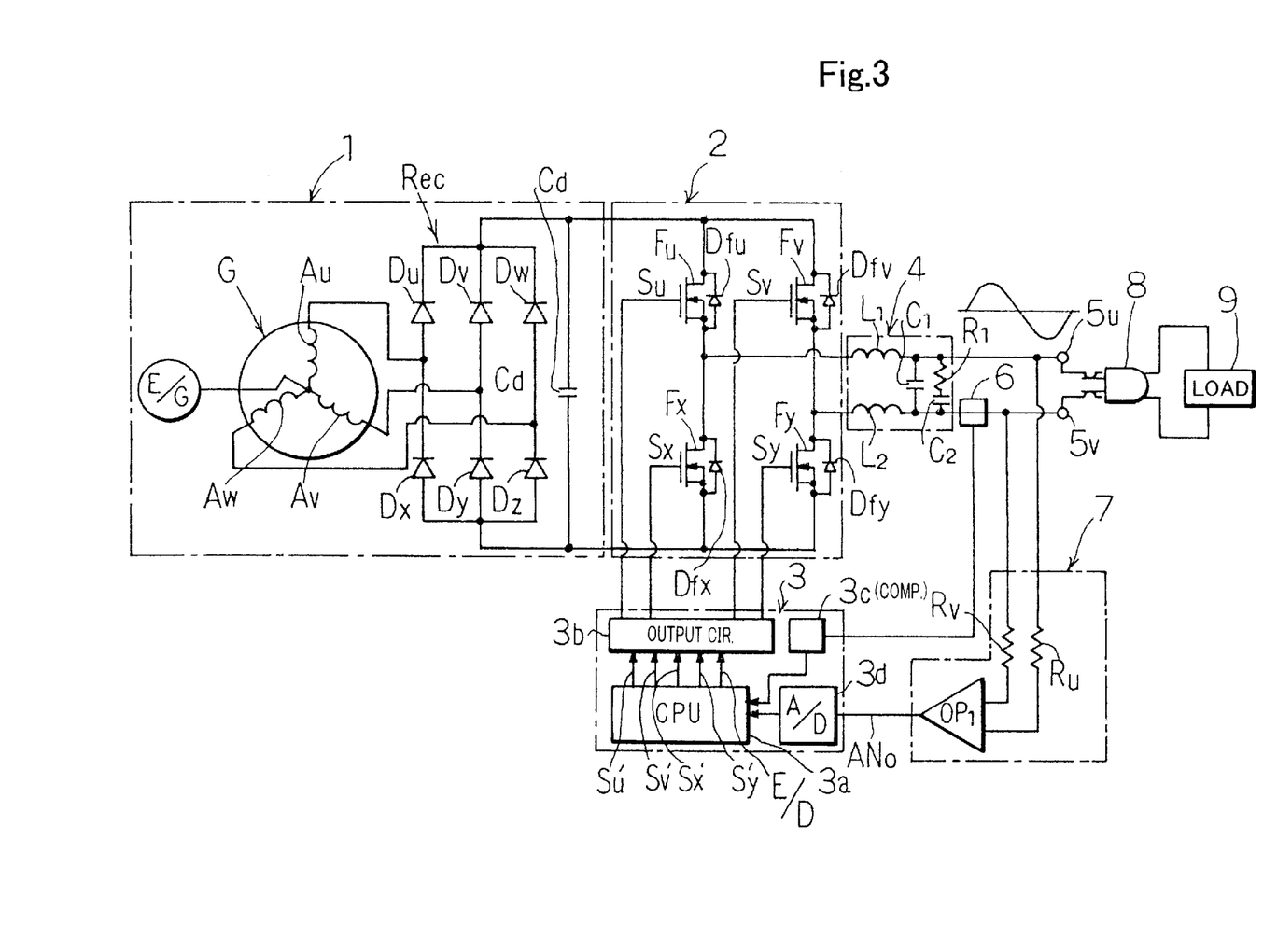
FIG. 3 is a schematic diagram of the inverter generation apparatus constructed in accordance with further embodiment of the invention.

Referring to FIG. 3, there is shown a hardware used for obtaining the correction coefficient for the duty ratio in accordance with the cumulative value of the sampling value of the AC output voltage.

In the illustrated embodiment, there is provided a load voltage detection circuit 7 to detect the AC voltage across the load connection terminals 5u and 5v. The output of the detection circuit 7 is input to the CPU 3a through an analogue/digital converter (A/D converter) 3d provided in the controller 3.

The load voltage detection circuit 7 comprises an operational amplifier OP1 and resistors Ru and Rv connected between the load connection terminals 5u and 5v and the input terminals of the operational amplifier OP1, respectively. The voltage proportional to the voltage across the load connection terminals is applied as the output voltage detection signal to the A/D converter 3d of the controller 3.

Also, in the embodiment of FIG. 3, there are omitted the DC voltage detection circuit 10 and the A/D converter 3e provided in the inverter generation apparatus of FIG. 1. The other construction is substantially identical to that of FIG. 1.

In the embodiment of FIG. 3, since the DC power circuit 1 is adapted to rectify the output of the generator G by using the full-wave rectifier Rec of diode bridge type having no thyristor included therein, the DC voltage obtained by rectifying the AC output of the generator G is output directly from the DC power circuit 1 and the characteristic of output voltage VD to output current ID of the DC power circuit 1 is as indicated in FIG. 4.

The CPU 3a of the controller detects the switch timings whenever the PWM period detecting counter in the microcomputer counts the clock pulses of the predetermined number corresponding to the PWM period Δt. The CPU 3a reads the instant date AN0 indicating the instant value of the voltage across the load connection terminals 5u and 5v to each of the switch timings as the sampling timing through the load voltage detection circuit 7 and the A/D converter 3d.

The CPU 3a arithmetically operates the reference duty ratio Do expressed by the formula (1) whenever the n-th switch timing (n=0 to T/Δt) is detected. The reference duty ratio Do may be arithmetically operated either by using the formula (1) in an actual manner or by giving an interpolation operation to the data read from the reference duty ratio operation map (the map storing the relation between n and Do in the form of the table) previously memorized in the ROM. Reference duty ratio arithmetical operation means can be accomplished by the steps of arithmetically operating the reference duty ratio Do in these manners.

Also, the CPU 3a arithmetically operates the average value Vav of one cycle of the AC voltage obtained across the load connection terminals by dividing by the sampling number n=T/Δt the cumulative value ΣVavn of the instant value Vavn of the AC output voltage detected by the load voltage detection circuit 7 to every sample timing during the period of one cycle of the sine-wave AC voltage across the load connection terminals. The average value Vav is given by the following formula (2).

$$V_{av} = \Sigma Vavn/(T/\Delta t) \quad (2)$$

wherein what is meant by ΣVavn is to sequentially accumulate the instant values Vavn of the output voltage detected to every sample timing from 0 to T/Δt.

The CPU 3a arithmetically operates the correction coefficient Kv' by which the reference duty ratio Do should be multiplied in order to make the average value Vav of the output voltage equal to the previously set value. In the ROM of the microcomputer is stored a correction coefficient arithmetical operation two-dimensional map which provides the relation between the average value Vav of the output voltage and the correction coefficient Kv'. The CPU 3a arithmetically operates the correction coefficient Kv' by using the map whenever the average value Vav should be arithmetically operated.

Correction coefficient arithmetical operation means can be accomplished by the steps of arithmetically operating the correction coefficient in this manner.

The CPU 3a arithmetically operates the real duty ratio D by multiplying the reference duty ratio Do by the thus obtained correction coefficient Kv' and supplies the drive command signals Su', Sv', Sx' and Sy' to the drive signal output circuit 3b so that the switch elements of the inverter circuit are turned on or off in the real duty ratio D.

The drive signal output circuit 3b supplies the drive signals to the switch elements of the inverter circuit 2 to which the drive command signal is applied from the CPU 3a to output from the inverter circuit 2 the AC voltage of the waveform obtained by PWM modulating the sine-wave AC voltage.

In the generation apparatus of FIG. 1, drive signal supply means can be accomplished by the step of generating the drive command signal from the CPU 3a in the thus obtained real duty ratio and in a predetermined switch pattern and the drive signal output circuit 3b to apply the drive signal to the inverter circuit 2 in accordance with the drive command signal.

As the correction coefficient Kv' by which the reference duty ratio Do should be multiplied in order to make equal to the set the average value of the sine-wave AC voltage obtained across the load connection terminals is arithmetically operated and is used for arithmetically operating the duty ratio for the on-off operation of the switch elements to the next switch timing, the AC voltage having the predetermined average value can be obtained across the load connection terminals without detecting the output voltage of the power supply section 1 Thus, the construction of the circuits can be simplified by omitting the DC voltage detection circuit which would be required for the prior art inverter generation apparatus and the cost therefore can be reduced.

With the apparatus constructed as aforementioned, since the duty ratio of the on-off operation of the switch elements of the inverter circuit is controlled so that the accumulation of the detected instant values of the AC output voltage is always kept at the predetermined value, much difference between the output voltage (the average or effective value) when loaded and the output voltage when unloaded can be prevented and therefore the variation ratio of the voltage due to variation in the load current can be reduced.

Although, in the illustrated embodiment, the average value of the AC output voltage over the period of one cycle thereof is obtained, it may be obtained over the period good for a pause in view of the waveform of the AC output voltage such as a quarter of one cycle, a half of one cycle, one cycle, two cycles and so on and the correction coefficient Kv' by which the reference duty ratio D0 should be multiplied in order to make the thus obtained average value equal to the set value may be arithmetically operated.

Nevertheless, the correction coefficient Kv' is not required to be always the value necessary for making the average value of the AC output voltage equal to the set value, but it may be the value necessary for making equal to the set value the effective value Vrms, the square of the effective value or the accumulation ΣVavn of the sampling instant values Vavn of the output voltage.

The effective value Vrms of the AC output voltage can be arithmetically operated by the following formula (3);

$$Vrms = \{(\Delta t/T)\Sigma(Vav)^2\}^{1/2} \quad (3)$$

Briefly, the correction coefficient arithmetical operation means realized by the CPU according to the invention serves to arithmetically operate the correction coefficient Kv' by which the reference duty ratio should be multiplied in order to make equal to the set value the value such as the cumulative value ΣVav itself, the average value, the effective value or the square of the effective value and so on, which is reflected by the cumulative value ΣVav of the output voltage detected by the load voltage detection circuit 7 to each of the sampling timings of the switch elements of the inverter circuit for the period good for a pause in view of the waveform of the sine-wave AC voltage obtained across the load connection terminals 5u and 5vn that is the period of 1/α cycle or α cycle or cycles (α is a positive integer).

In the invention, the maps used for arithmetically operating the correction coefficient Kv' may be either of the map to provide the relation between the average value of the AC output voltage and the correction coefficient Kv', the map to provide the relation between the effective value of the AC output voltage and the correction coefficient Kv', the map to provide the relation between the square of the effective value of the AC output voltage and the correction coefficient Kv' and the map to provide the relation between the the accumulative value ΣVav of the sampling instant value of the AC output voltage and the correction coefficient Kv'.

Although, in the illustrated embodiment, the switch elements of the inverter circuit is of FET, they may be of on-off controllable one such as bipolar transistor, insulated gate type bipolar transistor (IGBT) and so on.

In the aforementioned embodiments, the switch elements of the inverter is in the on-state to the switch timings appearing for every PWM period Δt. In case that the switch elements of the inverter are on-off controlled to such timings, the operation of the switch elements are made to the timings indicated in FIG. 11A.

Figures 11A, 11B:
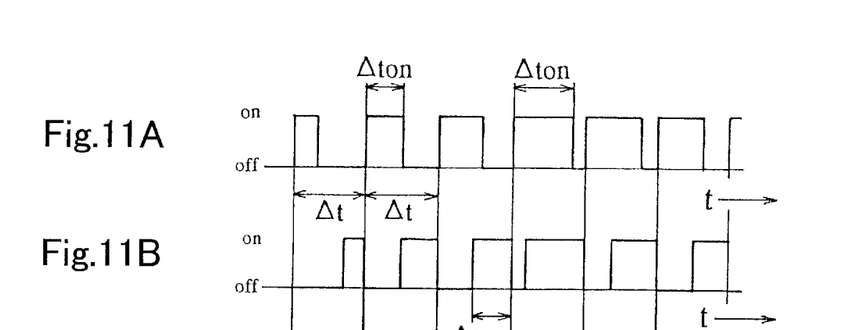
FIGS. 11A through 11D are timing charts showing various modifications of the timings to which the switch elements of the inverter are turned on or off.
Figure 11C:
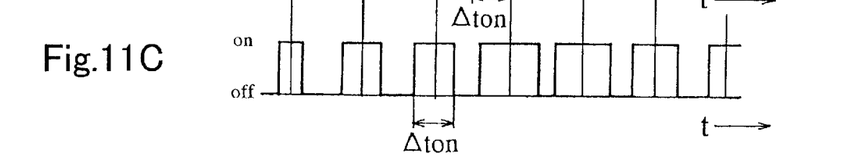

However, it should be noted that the switch elements of the inverter are not always on-off controlled only to such timings, but they may be controlled so that they get the off state to the timings appearing for every PWM period Δt as shown in FIG. 11B. Otherwise, they may be controlled so that the switch timings appealing for every PWM period Δt correspond to the center of the turning on period of the switch elements as shown in FIG. 11C. In this case, the duty ratio of the on-off operation of the switch elements gets Δton/Δt.

Figure 11D:
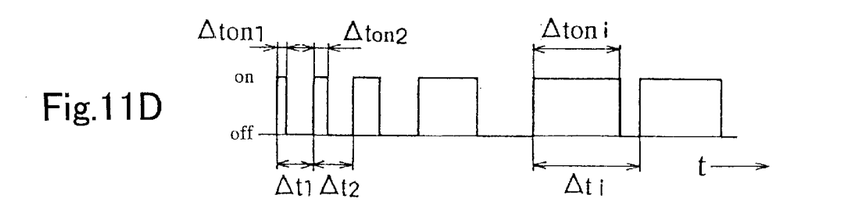

As shown in FIG. 11D, the invention may be applied to the cases in which the PWM period Δt varies as indicated by Δt1, Δt2, - - - Δti, - - - and so on. In this case, the controller corrects the duty ratios Δt on 1/Δt1, Δon 2/Δ t2, - - - , Δtoni/Δti, - - - and so on.

Although, in the illustrated embodiment, the waveform of the AC voltage across the load connection terminals is of sine-wave, it may be of sawtooth waveform(triangle waveform) or of rectangular waveform.

Although, in the illustrated embodiment, the microcomputer digitally controls the on-off operation of the switch elements of the inverter, an analogue circuit may control the on-off operation of the switch elements of the inverter.

Although, in the illustrated embodiment, the switch elements of the inverter are formed of FET, they may be formed of bipolar transistor or insulated gate type bipolar transistor (IGBT).

Although, in the illustrated embodiment, the inverter 2 is adapted to obtain a single phase AC output, it may be adapted to obtain a three-phase AC output. As well-known, the inverter generation apparatus adapted to obtain the three-phase AC output has an inverter formed of three-phase connected switch elements. In general, the invention may be applied to the inverter generation apparatus including a bridge inverter to convert the DC voltage output from the DC power circuit into the AC voltage by on-off controlling the switch elements of the switch circuit having the switch elements of 2 m number (m is an integer of 2 or more) bridge-connected.

Although some preferred embodiments of the invention have been described and illustrated with reference to the accompanying drawings, it will be understood by those skilled in the art that they are by way of example, and that various changes and modifications may be made without departing from the spirit and scope of the invention, which is defined only to the appended claims.

What is claimed is:

1. An inverter generation apparatus comprising a DC power circuit to obtain a DC voltage from an output of a generator as a power source, a bridge type inverter to which said DC voltage is input from said DC power circuit, a filter to remove a harmonic component of an output of said inverter, load connection terminals to which said output of said filter is input and a controller to control an on-off operation of each of predetermined switch elements of said inverter in a predetermined duty ratio to switch timings appealing for predetermined PWM period so as to obtain an AC output voltage of desired waveform across said load connection terminals, said controller comprising duty correction means to correct said duty ratio of said on-off operation of said element switches on-off driven to each of said switch timings for maintaining a predetermined waveform of said AC output voltage obtained across said load connection terminals even though said output voltage of said DC power circuit varies.

2. An inverter generation apparatus comprising a DC power circuit to obtain a DC voltage from an output of a generator as a power source, a bridge type inverter to which said DC voltage is input from said DC power circuit, a filter to remove a harmonic component of an output of said inverter, load connection terminals to which said output of said filter is input and a controller to control an on-off operation of each of predetermined switch elements of said inverter in a predetermined duty ratio to switch timings appearing for predetermined PWM period so as to obtain an AC output voltage of desired waveform across said load connection terminals, said apparatus further comprising a DC voltage detection circuit to detect a DC voltage output by said DC power circuit and said controller comprising duty correction means to correct said duty ratio of said on-off operation of said element switches on-off driven to each of said switch timings in accordance with a magnitude of said DC voltage detected by said DC voltage detection circuit for maintaining a set peak value of said AC output voltage obtained across said load connection terminals.

3. An inverter generation apparatus comprising a DC power circuit to obtain a DC voltage from an output of a generator as a power source, a bridge type inverter to which said DC voltage is input from said DC power circuit, a filter to remove a harmonic component of an output of said inverter, load connection terminals to which said output of said filter is input and a controller to control an on-off operation of each of predetermined switch elements of said inverter in a predetermined duty ratio to switch timings appearing for predetermined PWM period so as to obtain an AC output voltage of desired waveform across said load connection terminals, said apparatus further comprising a DC voltage detection circuit to detect a DC voltage output by said DC power circuit and said controller comprising reference duty ratio arithmetical operation means to arithmetically operate as a reference duty ratio an on-off duty ratio of said switch elements to each of said switch timings for forming a desired waveform of said AC output voltage obtained from said inverter through said filter, correction coefficient arithmetical operation means to arithmetically operate a correction coefficient by which said reference duty ratio to each of the switch timings should be multiplied so that a peak value of said AC output voltage gets equal to a set value, real duty ratio arithmetical operation means to arithmetically operate an on-off real duty ratio of said switch elements to each of said switch timings by multiplying said reference duty ratio by said correction coefficient and drive signal supply means to apply a drive signal to each of said switch elements of said inverter so as to make an on-off operation of said switch elements in said real duty ratio obtained by said real duty ratio arithmetical operation means.

4. An inverter generation apparatus comprising a DC power circuit to obtain a DC voltage from an output of a generator as a power source, a bridge type inverter to which said DC voltage is input from said DC power circuit, a filter to remove a harmonic component of an output of said inverter, load connection terminals to which said output of said filter is input and a controller to control an on-off operation of each of predetermined switch elements of said inverter in a predetermined duty ratio to switch timings appearing for predetermined PWM period so as to obtain an AC output voltage of desired waveform across said load connection terminals, said controller comprising reference duty ratio arithmetical operation means to arithmetically operate as a reference duty ratio an on-off duty ratio of said switch elements to each of said switch timings for forming a desired waveform of said AC output voltage obtained from said inverter through said filter, load voltage detection circuit to detect said AC output voltage obtained across said load connection terminals; correction coefficient-arithmetical operation means to arithmetically operate a correction coefficient by which said reference duty ratio to each of the switch timings should be multiplied so that a value reflecting a cumulative value of said output voltage detected by said load voltage detection circuit during a period of $1/\alpha$ or $\alpha$ ($\alpha$ is a positive integer of one or more than one) of said AC voltage obtained across said load connection terminals is made equal to a set value; real duty ratio arithmetical operation means to arithmetically operate an on-off real duty ratio of said switch elements to each of said switch timings by multiplying said reference duty ratio by said correction coefficient and drive signal supply means to apply a drive signal to each of said switch elements of said inverter so as to make an on-off operation of said switch elements in said real duty ratio obtained by said real duty ratio arithmetical operation means.

5. An inverter generation apparatus as set forth in claim 4 and wherein an average value of said AC voltage obtained from said cumulative value is used for said value reflecting said cumulative value.

6. An inverter generation apparatus as set forth in claim 4 and wherein an effective value of said AC voltage obtained from said cumulative value is used for said value reflecting said cumulative value.

7. An inverter generation apparatus as set forth in claim 4 and wherein a square of an effective value of said AC voltage obtained from said cumulative value is used for said value reflecting said cumulative value.

8. An inverter generation apparatus as set forth in claim 4 and wherein said cumulative value itself is used for said value reflecting said cumulative value.

* * * * *